United States Patent
Baker et al.

(10) Patent No.: US 6,185,627 B1
(45) Date of Patent: Feb. 6, 2001

(54) ANALOG AND DIGITAL AUDIO AUTO SENSE

(75) Inventors: John L. Baker, Sioux City; Mark Rapaich, Westfield, both of IA (US)

(73) Assignee: Gateway, Inc., N. Sioux City, SD (US)

(*) Notice: Under 35 U.S.C. 154(b), the term of this patent shall be extended for 0 days.

(21) Appl. No.: 09/131,543

(22) Filed: Aug. 10, 1998

Related U.S. Application Data (60) Provisional application No. 60/083,278, filed on Apr. 28, 1998.

(51) Int. Cl.$^7$ ............... G06F 13/10; G06F 9/04; H03M 1/34
(52) U.S. Cl. ............... 710/1; 710/16; 710/100; 327/99
(58) Field of Search ............... 710/1, 16, 69, 710/70, 100, 129, 131; 712/214; 702/1; 341/144, 173; 327/99, 70; 345/98, 156

(56) References Cited

U.S. PATENT DOCUMENTS

| | | | |
|---|---|---|---|
| 3,713,099 | * | 1/1973 | Hemstreet . |
| 4,658,099 | * | 4/1987 | Frazer . |
| 5,036,406 | * | 7/1991 | Sanders . |
| 5,519,396 | * | 5/1996 | Distinti . |
| 6,023,260 | * | 2/2000 | Higashi . |

* cited by examiner

Primary Examiner—Gopal C. Ray
(74) Attorney, Agent, or Firm—Suiter & Associates PC; Kenneth J. Cool (57) ABSTRACT

A method and apparatus for selectively sending a first signal or a second signal to an output signal are described. An electrical characteristic of a device coupled to the output is determined, and, in the event the electrical characteristic is determined to be a predetermined value, the first signal to the output, otherwise, the second signal is sent. A detector coupled to the output of an information handling system detects a characteristic of a device coupled to the output. The characteristic is indicative of the type of signal sent to the output. A first type of signal is sent to the output when the characteristic has a predetermined value and a second type of signal is sent to the output when the characteristic does not have the predetermined value. Whether a speaker is an analog speaker or a digital speaker may be automatically determined, and an appropriate analog or digital signal is sent to the speaker depending upon its type.

62 Claims, 8 Drawing Sheets

ANALOG AND DIGITAL AUDIO AUTO SENSE

CROSS-REFERENCE TO RELATED APPLICATION

The present application claims the benefit under 35 U.S.C. § 119(e) of U.S. application Ser. No. 60/083,278 filed Apr. 28, 1998.

FIELD OF THE INVENTION

The present invention generally relates to the field of information handling systems, and particularly to analog and digital audio signals in information handling systems.

BACKGROUND OF THE INVENTION

Multimedia information handling systems typically utilize a sound card or expansion board for reproducing audio information from an audio formatted file stored in the information handling system such as a WAV file, MIDI file, or music stored on a compact disk or DVD played from a drive of the information handling system. Typically, the sound card provides an analog audio signal that drives one or a set of speakers, or that drives an external amplifier that in turn drives one or more speakers at higher volumes.

The application of digital processing techniques to audio recording, storage, and reproduction has resulted in a proliferation of digital audio equipment. As an example, digital filtering techniques may be utilized in lieu of traditional analog crossover networks to separate audio signals into low frequency and high frequency bands for driving woofer and tweeter drivers, respectively. The use of digital filtering and other digital processing techniques provides control over audio signals to a precision that cannot be achieved though traditional analog systems. However, a great number of presently existing audio systems utilize analog signal processing. Thus, most audio equipment provide both analog and digital inputs and outputs in order to be able to interface with either analog or digital systems. It would be desirable to provide a sound card, or similar output of an information handling system, having both analog and digital outputs for connecting the sound card to either analog or digital audio systems. Further, it would be desirable to provide a sound card having a single output jack that automatically detects the type of audio system connected to the output jack and that provides either the appropriate analog or digital output signal to the output jack in response to the detected audio system.

SUMMARY OF THE INVENTION

The present invention is directed to a method for selectively sending a first signal or a second signal to an output. In one embodiment, the method includes steps for determining an electrical characteristic of a device coupled to the output, in the event the electrical characteristic is determined to be a predetermined value, sending, the first signal to the output, and otherwise, sending the second signal to the output.

The present invention is further directed to an information handing system for automatically determining the type of signal to send to an output of the information handing system. In one embodiment, the information handling system includes a processor for executing instructions on the information handling system, a memory coupled to the processor for storing the instructions, and a detector coupled to the output of the information handling system for detecting a characteristic of a device coupled to the output, the characteristic being indicative of the type of signal to be sent to the output wherein a first type of signal is sent to the output when the characteristic has a predetermined value and a second type of signal is sent to the output when the characteristic does not have the predetermined value. The method and the information handling system are capable of automatically determining whether a speaker is an analog speaker or a digital speaker and sending an appropriate analog or digital signal to the speaker depending upon its type.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
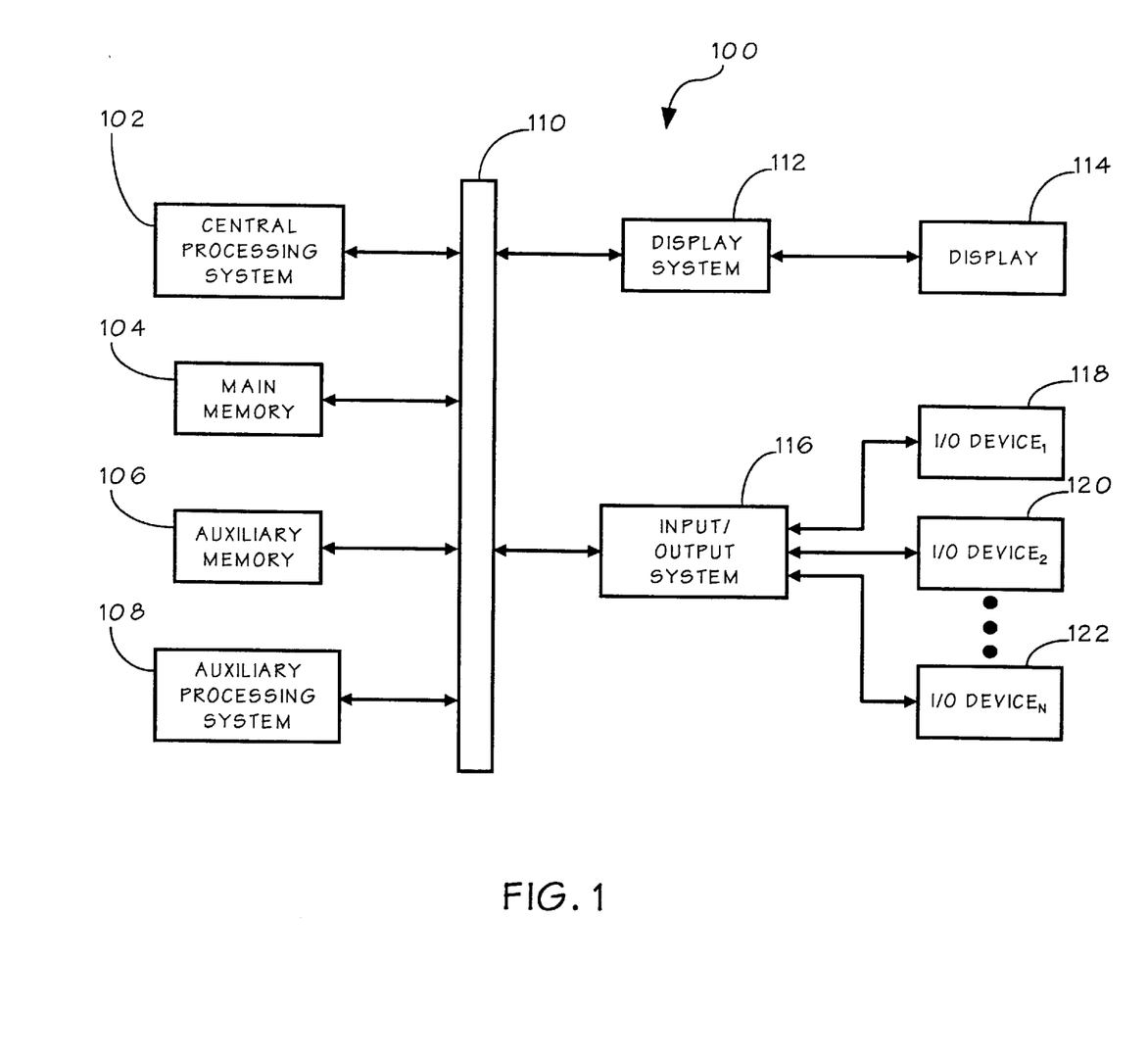
FIG. 1 is a block diagram of an information handling system operable to embody the present invention.

Referring now to FIG. 1, an information handling system in accordance with the present invention is shown. The information handling system shown in FIG. 1 is generally representative of the hardware architecture of an information handling system of the present invention. A central processing system 102 controls the information handling system 100. Central processing system 102 includes a central processing unit such as a microprocessor or microcontroller for executing programs, performing data manipulations and controlling the tasks of information handling system 100. Communication with central processor 102 is implemented though a system bus 110 for transferring information among the components of information handling system 100. Bus 110 may include a data channel for facilitating information transfer between storage and other peripheral components of information handling system 100. Bus 110 further provides the set of signals required for communication with central processing system 102 including a data bus, address bus, and control bus. Bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of information handling system 100 include main memory 104, auxiliary memory 106, and an auxiliary processing system 108 as required. Main memory 104 provides storage of instructions and data for programs executing on central processing system 102. Main memory 104 is typically semiconductor based memory such as dynamic random access memory (DRAM) and or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semicondutor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Information handling system 100 may optionally include an auxiliary processing system 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Information handling system 100 further includes a display system 112 for connecting to a display device 114, and an input/output (I/O) system 116 for connecting to one or more I/O devices 118, 120 up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between one or more of I/O devices 118–122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic tansducer, microphone, speaker, etc. Input/output system 116 and I/O devices 118–122 may provide or receive analog or digital signals for communication between information handling system 100 of the present invention and external devices, networks, or information sources. Input/output system 116 and I/O devices 118–122 preferably implement industry promulgated architecttre standards, including Ethernet IEEE 802 standards (e.g., IEEE 802.3 for broadband and baseband networks, IEEE 802.3 z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of information handling system 100 of FIG. 1 by one having ordinary skill in the art would not depart from the scope or the spirit of the present invention.

Figure 2:
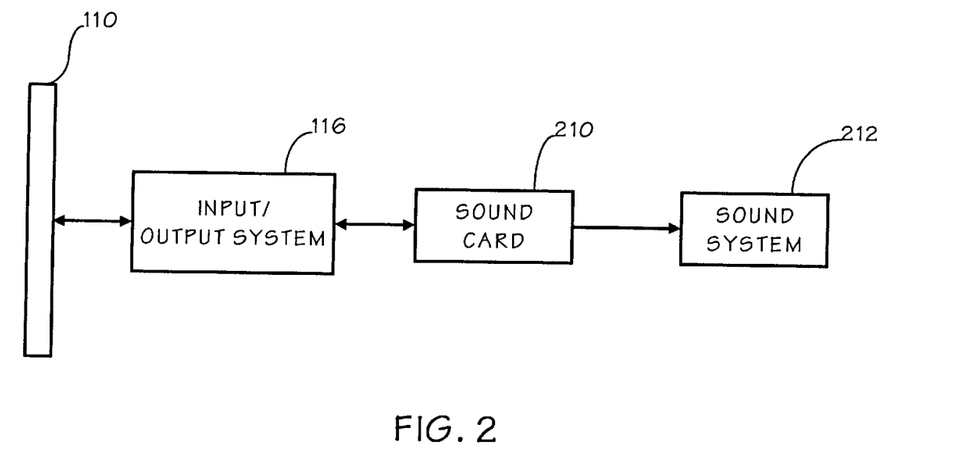
FIG. 2 is a block diagram of a sound card and sound system in accordance with the present invention.

Referring now to FIG. 2, a block diagram of a sound card and sound system of the present invention will be discussed. A sound card 210 couples to bus 110 via input/output system 116 of computer based information handling system 100 of FIG. 1. Sound card 210 is utilized in conjunction with information handling system 100 for reading information saved or recorded as files in main memory 104 or auxiliary memory 106 (e.g., CD-ROM, DVD-ROM, etc.) of information handling system 100. The files are read by sound card 210 and converted into basic sound, speech or music for reproduction by sound system 212. Thus sound or audio information may be stored and processed by information handling system 100 as a data file, for example as a waveform audio format (WAV) or a musical instrument digital interface (MIDI) file to be read at an appropriate time by processor 102 and converted into an appropriate audio signal by sound card 210. Sound system 212 may be any type of device or system capable of receiving an audio output signal from sound card 210 such as an amplifier, receiver, speakers, headphones, etc.

Figure 3:
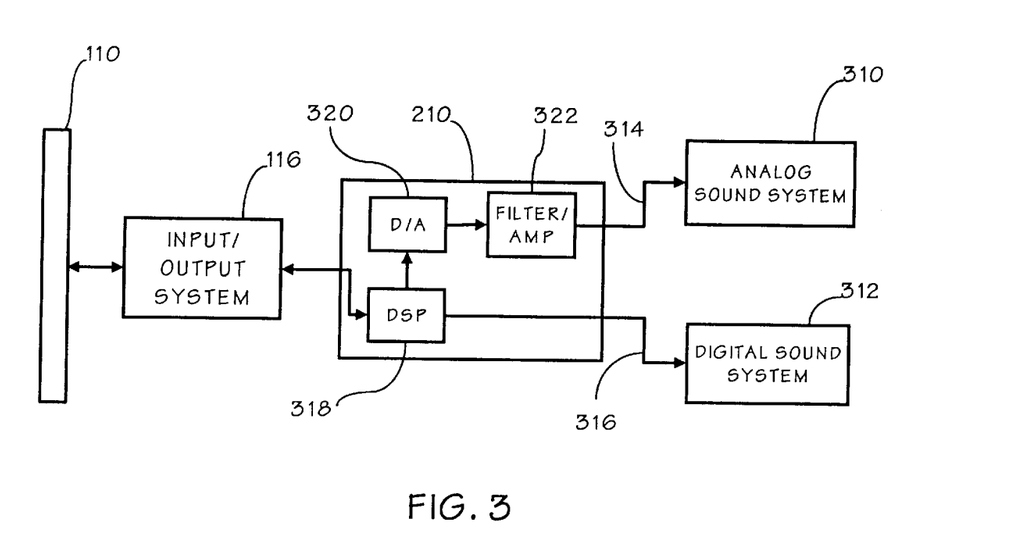
FIG. 3 is a block diagram of a sound card as shown in FIG. 2 coupleable to either an analog or a digital sound system in accordance with the present invention.

Referring now to FIG. 3, a block diagram of a sound card as shown in FIG. 2 coupleable to either an analog or a digital sound system in accordance with the present invention will be discussed. In general, sound card 210 is capable of providing either an analog formatted output signal or a digital formatted output signal to an external sound system 212 coupled thereto. It is typically desired that the analog output signal is provided to an analog sound system 310 via analog transmission line 314 and that the digital output signal is provided to a digital sound system 312 via digital transmission line 316. Most conventional sound systems are analog type systems, however a large number of systems are digital sound systems to take advantage of the signal processing power and minimal loss in fidelity of digital processing techniques.

Sound card 210 includes a general purpose microprocessor, controller or digital signal processor 318. The output of digital signal processor 318 is received by a digital-to-analog converter 320 for translating a digital valued signal received from processor 318 into an analog valued signal. The output of digital-to-analog converter 320 passes through a filter and amplifier network 322 for smoothing out the analog output signal of digital-to-analog converter 320 and for providing an output signal to drive analog sound system 310. A digital signal may be sent directly from processor 318 to digital sound system 312. Sound card 210 may further include other functional blocks or subcircuits not shown such as an input circuit, MIDI control circuit, joystick input circuit, synthesizer, etc.

Figure 4:
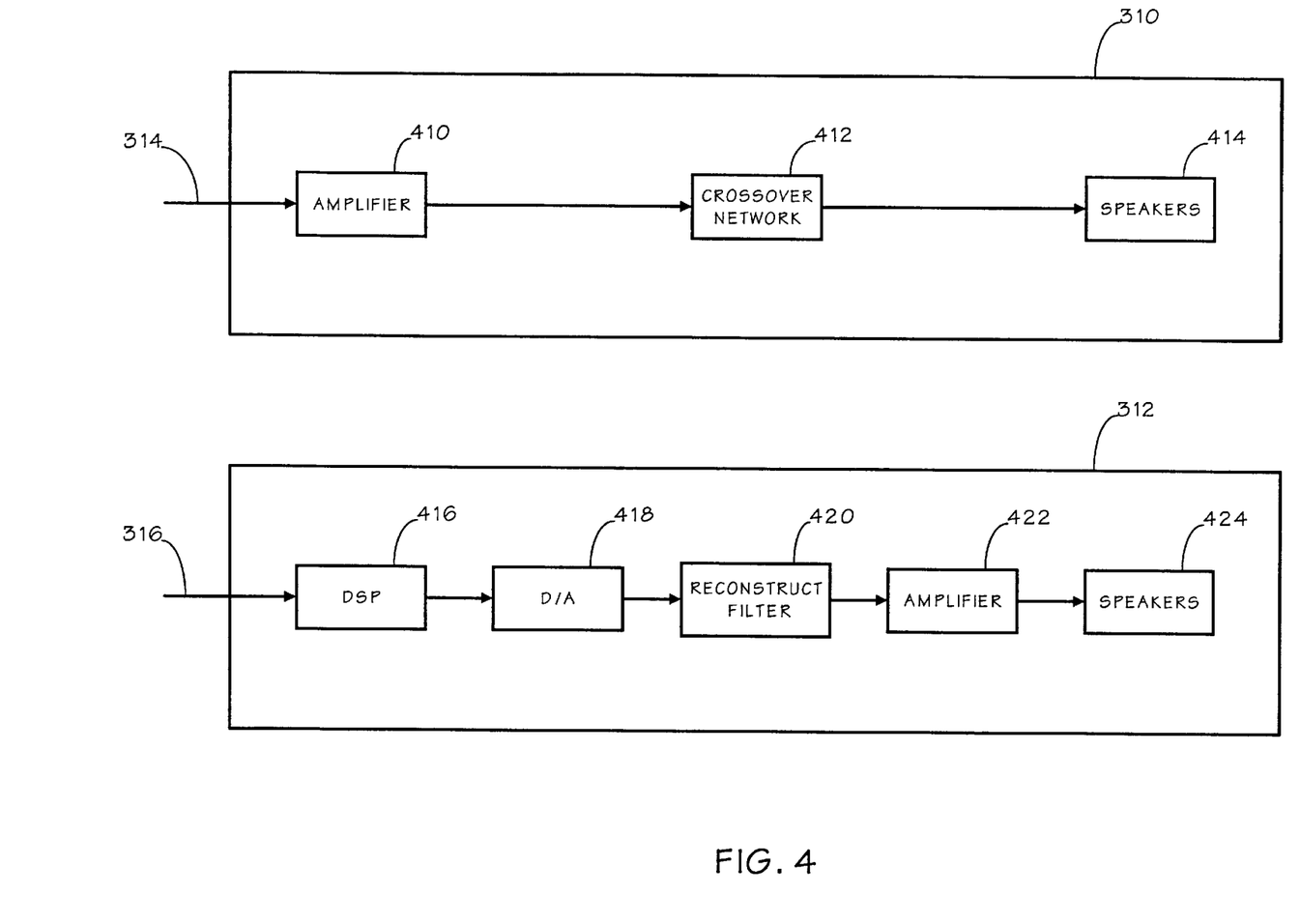
FIG. 4 is a block diagram showing in further detail an analog and a digital sound system as shown in FIG. 3.

Referring now to FIG. 4, a block diagram showing in further detail an analog and a digital sound system as shown in FIG. 3 will be discussed. Typical components of analog sound system 310 and digital sound system 312 are shown. Analog sound system 310 receives an analog signal from sound card 210 via analog transmission line 314. The analog signal feeds into an amplifier which increases the amplitude of the analog signal and provides the necessary current drive one or more speakers 414 at the desired output power. If speakers 414 comprise frequency dependent drivers (e.g., woofers and tweeters), a crossover network 412 is utilized to divide the analog signal into appropriate frequency bands for each of the drivers.

Digital sound system 312 receives a digital signal from sound card 210 via digital transmission line 316. The digital signal is received by a digital signal processor 416, a microprocessor having an architecture optimized for fast execution of signal processing algorithms. The output of digital signal processor 416 is received by a digital-to-analog converter 418 for translating a digital valued signal into an analog valued signal. The output of digital-to-analog converter 418 passes through a reconstruction filter for smoothing out the analog output signal of digital-to-analog converter 418 to provide an analog signal suitable for amplification by amplifier 422. The amplified output from amplifier 422 drives one or more speakers 424.

Figure 5A:
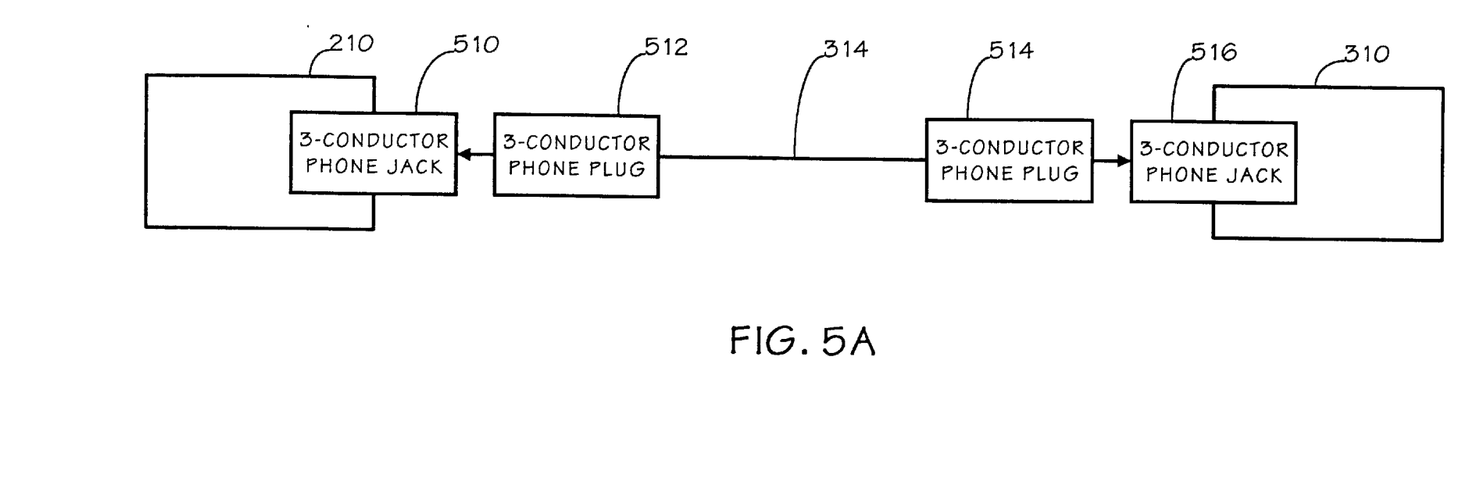
FIGS. 5A and 5B are block diagrams illustrating connectors for coupling a sound card as shown in FIG. 2 to either an analog or a digital sound system in accordance with the present invention.
Figure 5B:
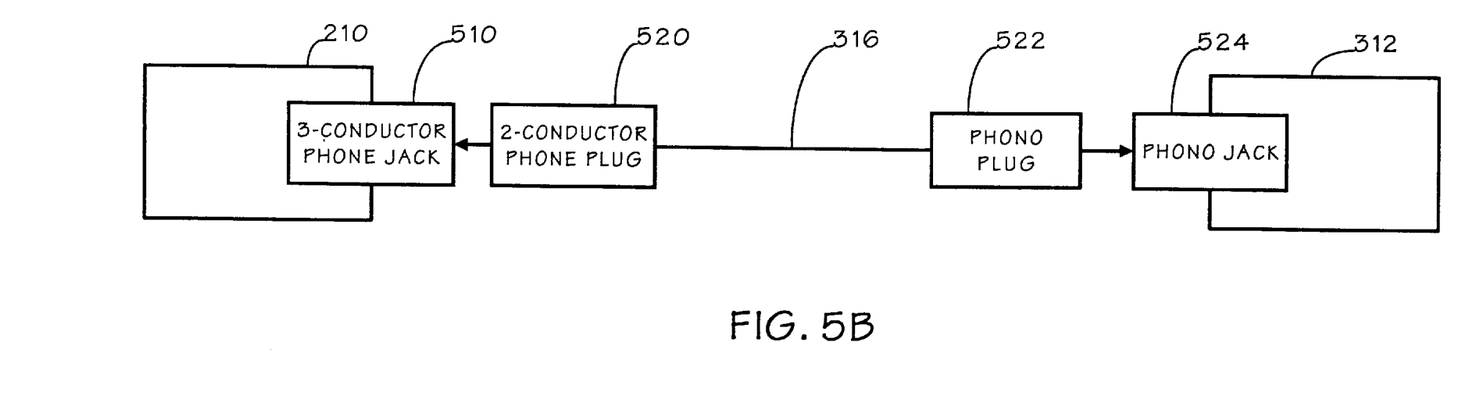

Referring now to FIGS. 5A and 5B, block diagrams illustrating connectors for coupling a sound card as shown in FIG. 2 to either an analog or a digital sound system in accordance with the present invention will be discussed. In one embodiment of the present invention, sound card 210 utilizes a three conductor output receptacle 510 to provide either an analog or a digital output signal. Three conductor output receptacle may be a phone jack, for example, having a nominal receptacle diameter of 3.5 mm (one-eighth inch). Three conductor phone jack 510 has an outer terminal called the sleeve, an intermediate terminal called the ring, and an inner terminal called the tip. Phone jack 510 may be physically mounted on sound card 210. As shown in FIG. 5A, when sound card 210 provides an analog audio output signal, the signal is preferably a stereo signal in which case three conductors are required. Thus, a three conductor phone plug 512 is insertable into phone jack 512 for transmitting the analog output signal via analog transmission line 314. Phone plug 512 has a ring, a sleeve and a tip contact for coupling to ring, sleeve, and tip contacts, respectively, of phone jack 510. An identical or similar three conductor phone plug couples transmission line 314 to a three conductor phone jack 516 disposed on analog sound system 310. Phone jack 516 may be identical or similar to phone jack 510.

As shown in FIG. 5B, when sound card 210 provides a digital audio output signal, the digital signal only requires two conductors, even in the situation where the digital audio signal is a stereo signal. Thus, a two conductor phone plug is insertible into phone jack 510. Phone jack 510 is preferably designed to functionally couple with either a two conductor or a three conductor phone plug. Phone plug has a sleeve contact and a tip contact (no ring contact) for coupling to the sleeve and tip contacts, respectively, of phone jack 510. When a two conductor phone plug such as phone plug 520 couples with a three conductor phone jack such as phone jack 510, the sleeve contact also couples to the ring contact of the phone jack. Phone plug 520 couples with phone jack 510 for transmitting the digital signal via digital transmission line 316 to digital sound system 312. A phono plug 522 couples digital transmission line to a phono jack 524 disposed on digital audio system 312. Phono jack 524 is also known as an RCA jack and has a coaxial configuration comprising a cylindrical center conductor contact and an outer cylindrical shield contact separated by a cylindrical insulator. Phono jack 524 may be approximately one-quarter inch in diameter. Phono plug 522 is designed to cooperatively mate with phono jack 524. As an example, the analog output signal transmitted via analog transmission line 314 may be a stereo encoded analog information signal. The digital output signal transmitted via digital transmission line 316 may be a Sony/Philips Digital Interface Format (S/PDIF) digital information signal. Further, digital sound system 312 may be a digital speaker system.

Figure 6A:
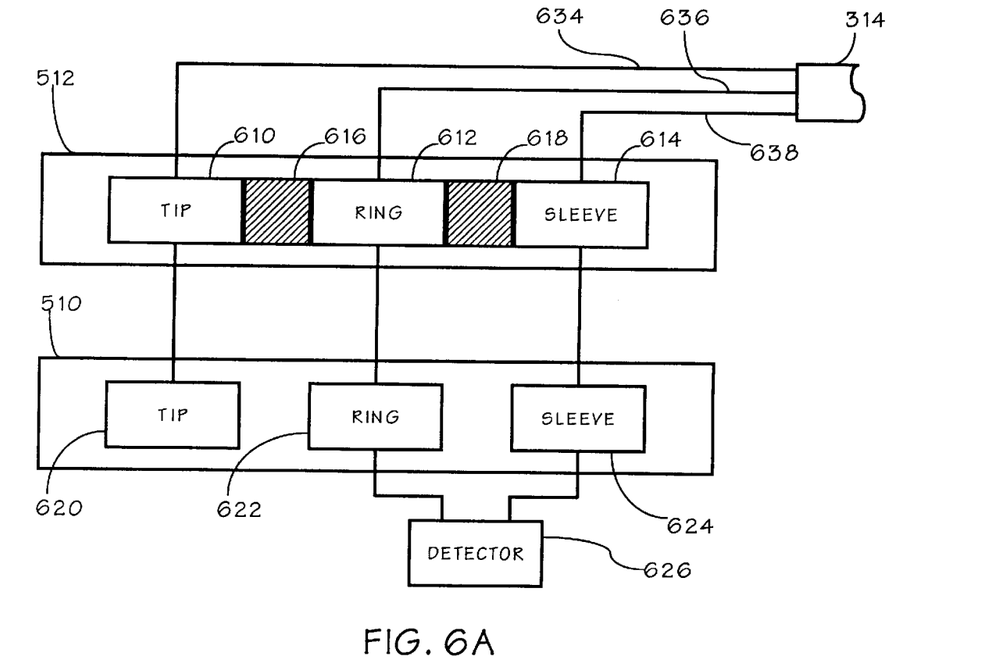
FIGS. 6A and 6B are block diagrams illustrating the coupling of connector plugs with a receptacle by which an analog or a digital coupling may be detected in accordance with the present invention.
Figure 6B:
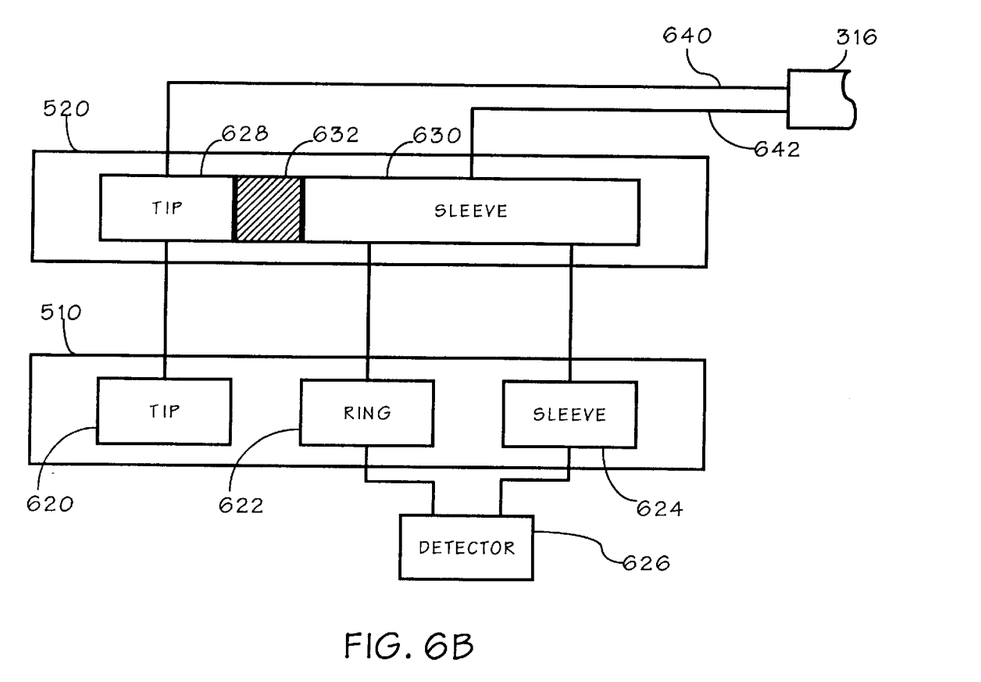

Referring now to FIGS. 6A and 6B, block diagrams illustrating the coupling of connector plugs with a receptacle by which an analog or a digital connector may be detected in accordance with the present invention will be discussed. As shown in FIG. 6A, three conductor phone plug 512 has a tip contact 610, a ring contact 612 and a sleeve contact 614 coupled to conductor 634, 636 and 638, respectively, of transmission line 314. Insulator 616 electrically isolates tip contact 610 and ring contact 612, and insulator 618 electrically isolates ring contact 612 and sleeve contact 614. When inserted into three conductor phone jack 510, tip 610, ring 612, and sleeve 614 contacts of plug 512 electrically couple to tip 620, ring 622 and sleeve 624 contacts, respectively, of phone jack 510 as shown. A detector 626 connects to ring 622 and sleeve 624 contacts of phone jack 510 to detect the type of connector inserted into phone jack 510.

As shown in FIG. 6B, two conductor phone plug 520 has a tip contact 628 and a sleeve contact 630 coupled to conductors 640 and 642, respectively, of transmission line 316. Insulator 632 electrically isolates tip contact 628 and sleeve contact 630. When inserted into jack 510, tip contact 628 of phone plug 520 electrically couples to tip contact 620 of jack 510. Further, sleeve contact of plug 520 electrically couples to both ring contact 622 and sleeve contact 624 of jack 510. Thus, sleeve contact 630 of plug 520 provides a short circuit between ring contact 622 and sleeve contact 624 of jack 510 when plug 520 is inserted into jack 510.

Detector 626 detects whether three conductor plug 512 or two conductor plug 520 is inserted into jack 510. In response to the detected connector (i.e. two or three conductor plug), sound card 210 sends an appropriate output signal to output jack 510 to be transmitted via transmission line 314 or 316. Detector 626 measures the impedance (i.e. resistance, reactance, or both) between ring 622 and sleeve 624 contacts of phone jack 510. When three conductor phone plug 512 is inserted into jack 510, the impedance between sleeve 624 and ring 622 is a non short circuit, or non-zero valued, and thus detector 626 detects three conductor plug 512 upon detecting a non-zero impedance. When a non-zero impedance is detected between ring 622 and sleeve 624, sound card 210 provides an analog output signal to phone jack 510. When two conductor phone plug 520 is inserted into jack 510, the impedance between ring 622 and sleeve 624 is a short circuit value, or zero ohms. When a short circuit value, or zero ohm impedance is detected between ring 622 and sleeve 624, sound card 210 provides a digital output signal to phone jack 510. The short circuit value may be any predetermined value suitable to detect a short circuit between ring 622 and sleeve 624, and may be any value below a threshold value. Conversely, a non-short circuit value may be any value suitable to detect a non-short circuit, and may be any value above a threshold value. Thus, tavo conductor plug 520 (short circuit) may be detected when the ring 622 to sleeve 624 impedance is zero or essentially zero ohms, or alternatively may be detected when the measured impedance is less than a threshold value (e.g., less than 10 ohms) since contact impedance between ring 622 and sleeve 624 contacts and sleeve contact 630 may provide a short circuit impedance greater than zero ohms. Additionally, three conductor plug 512 (non-short circuit) value may be detected when the ring 622 to sleeve 624 impedance is not equal to zero ohms, or alternatively may be detected when the measured impedance is greater than a threshold value (e.g., greater than 100 ohms). Thus, detector 626 is capable of detecting three conductor plug 512 when a non-short circuit impedance is measured, and is capable of detecting two conductor plug 520 when a short circuit impedance is measured. Furthermore, no plug (i.e., absence of a plug) may be detected when the measured ring 622 to sleeve 624 impedance is an open circuit value, or alternatively when the measured impedance is greater than a threshold valued (e.g., greater than one megohm). When plug 512 is inserted into jack 510 but plug 514 is not inserted into jack 516, an open circuit condition occurs, but when plug 514 is inserted into jack 516, a non-short circuit, non-open circuit condition may occur. Thus, plug 512 may be detected when a non-short circuit, non-open circuit condition is measured, or alternatively when an open circuit condition is measured.

Detector 626 may be implemented in one ore more tangible embodiments. For example, detector 626 may be a resistance meter coupled across ring 622 and sleeve 624 contacts. Alternatively, detector 626 may be a hardware embodiment either permanently programmed to detect the ring to sleeve impedance or controlled by a program of instructions executed by processor 102 of information handling system or executed by processor 318 of FIG. 3. In a further embodiment, detector 626 may include a circuit that detects current from a voltage applied across ring 622 and sleeve 624 wherein a higher current value corresponds to a short circuit (e.g., two conductor plug), and a lower current value corresponds to a non-short circuit (e.g., three conductor plug).

Figure 7A:
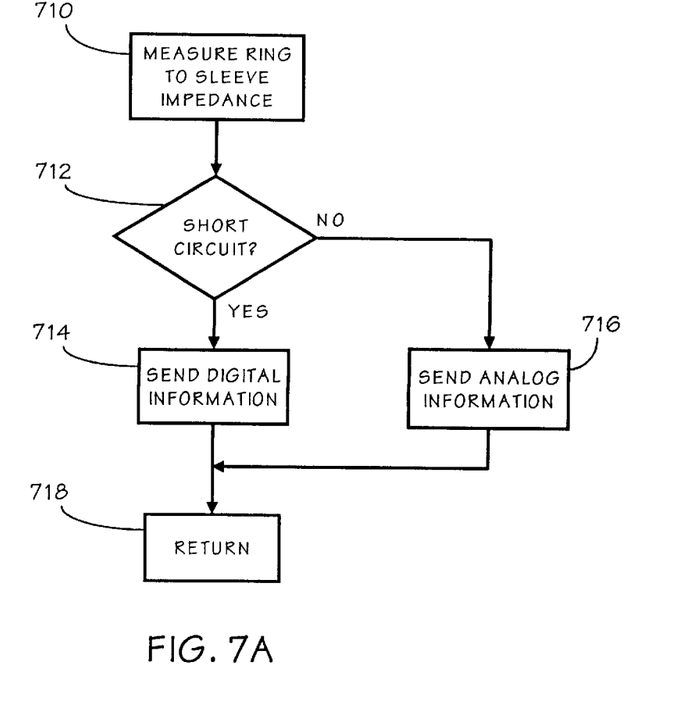
FIGS. 7A and 7B are flow diagrams of a method for selectively sending either an analog or a digital signal to an output of a sound card as shown in FIG. 3 in accordance with the present invention.
Figure 7B:
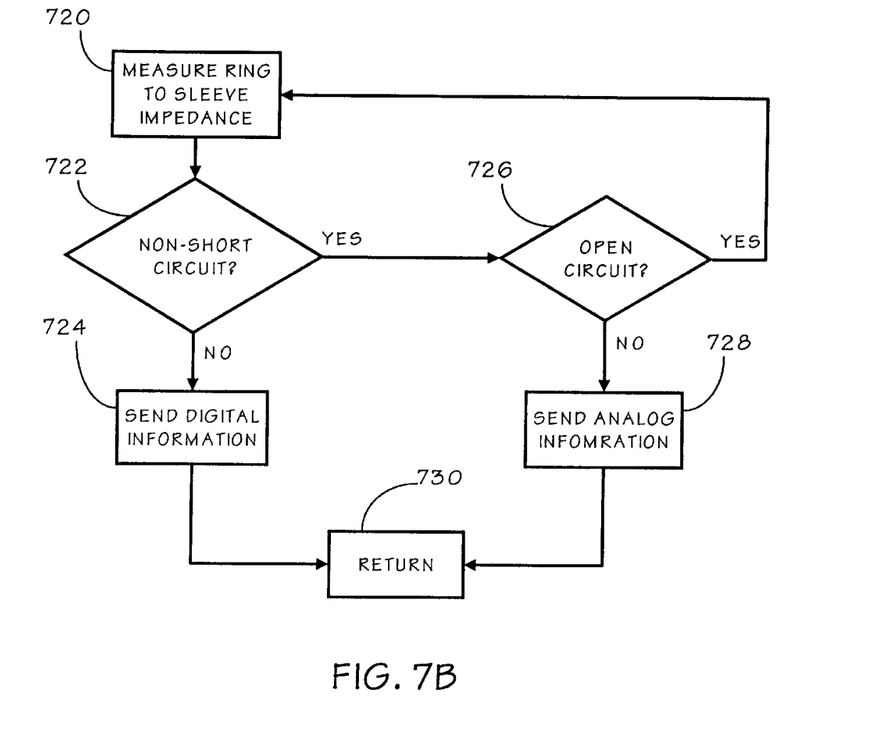

Referring now to FIGS. 7A and 7B, flow diagrams of a method for selectively sending either an analog or a digital signal to an output receptacle of a sound card as shown in FIG. 3 in accordance with the present invention will be discussed. As shown in FIG. 7A, the ring 622 to sleeve 624 impedance of phone jack 510 is measured at step, 710. The impedance (resistance, reactance, or both) may be measured. Alternative electrical characteristics between the ring and sleeve contacts may also be determined without departing from the scope of the invention. For example, the admittance (conductance, substance, or both) or any two port parameter may be measured. A determination is made at step 712 whether the measured impedance indicates a short circuit condition between ring 622 and sleeve 624. In the event a short circuit condition is detected (for example sleeve 630 of two conductor plug 520 shunting ring 622 and sleeve 624 of three conductor jack 510), a digital information signal is sent to output jack 510 at step 714. In such a case, the digital information signal may be applied between tip 620 and either ring 622 or sleeve 624. In the event a short circuit condition is not detected (for example three conductor plug 512 is inserted into three conductor jack 510), an analog information signal is sent to output jack 510 at step 716. In such a case, the analog information signal may be applied between tip 620 and sleeve 624 and between ring 622 and sleeve 624 such as where the analog signal is a stereo signal. Return step 718 restarts the method at step 710 such that output jack 510 may be continuously monitored.

As shown in FIG. 7B, the ring 622 to sleeve 624 impedance of phone jack 510 is measured at step 720. A determination is made at step 722 whether a non-short circuit condition exists between ring 622 and sleeve 624. In the event a non-short circuit condition is not detected (for example sleeve 630 of two conductor plug 520 shunting ring 622 and sleeve 624 of three conductor jack 510), a digital information signal is sent to output jack 510 at step 724. In the event a non-short circuit condition is detected, a determination is made whether an open circuit condition exists at step 726. In the event an open circuit condition is not detected (for example three conductor plug 512 is inserted into three conductor jack 510), an analog information signal is sent to output jack 510 at step 728. In the event an open circuit condition is detected (for example no plug is inserted into phone jack 510), the method continues to monitor the ring 622 to sleeve impedance at step 720 until either two conductor plug 520 or a three conductor plug 512 is inserted into jack 510. Altenmatively, the method shown in FIG. 7B may be modified such that step 728 is always executed in the event a non-short circuit condition is detected. Return step 730 restarts the method at step 710 such that output jack 510 may be continuously monitored.

Figure 8A:
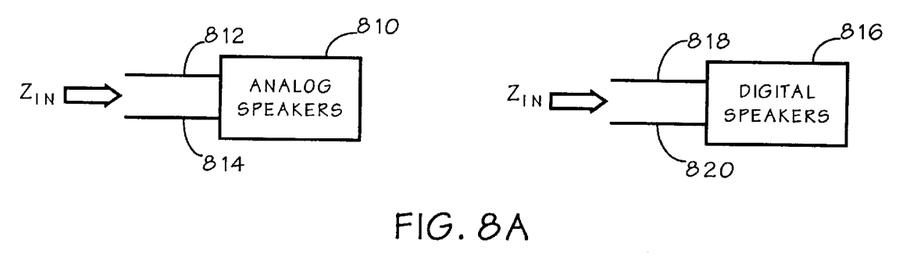
FIGS. 8A–8C are block diagrams illustrating a method for distinguishing between a passive analog speaker and a digital speaker system in accordance with the present invention.
Figure 8B:
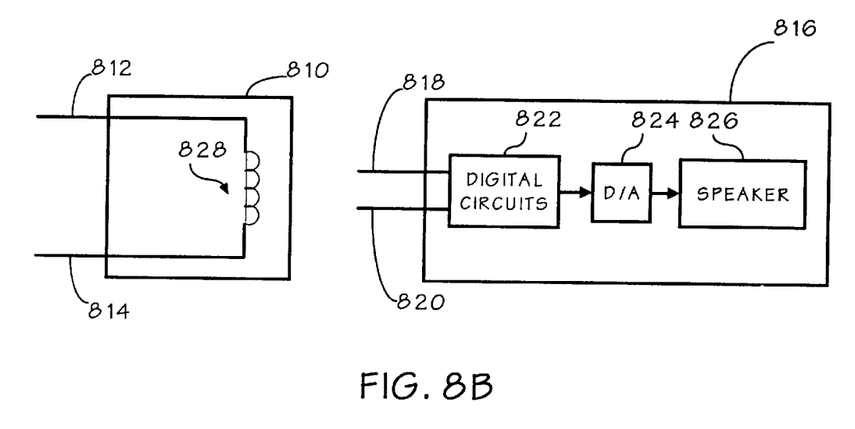
Figure 8C:
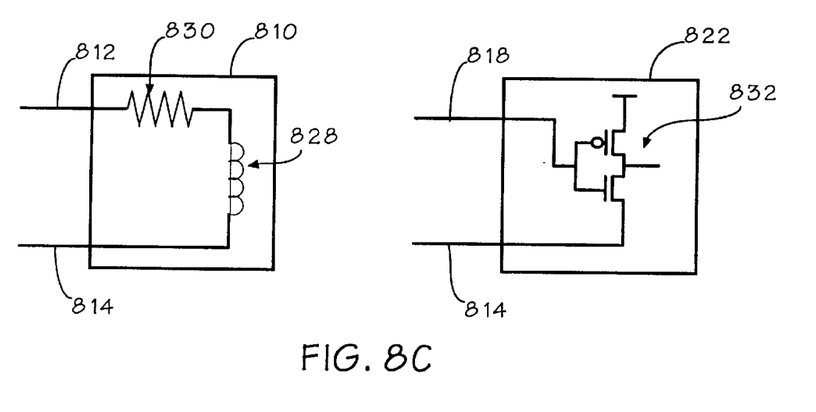

Referring now to FIGS. 8A–8C, a method for distinguishing between a passive analog speaker and a digital speaker system will be discussed. As shown in FIG. 8A, one or more analog speakers 810 or one or more digital speakers 816 may be coupled to sound card 210. Since analog speakers 810 are designed to be driven with an analog signal and digital speakers 816 are designed to be driven with a digital signal, sound card 210 determines which type of speakers are connected to sound card 210 by examining an electrical characteristic of the connected speakers or speaker system. For example, as shown in FIG. 8A, the impedance measured across the input terminals 812 and 814 of analog speakers 810 may have a different value, or range of values, than the impedance measured across the input terminals 818 and 820 of digital speakers 816. By examining, or measuring, the input impedance of an unknown type of speaker or speaker system, sound card 210 may determine the speaker type and send an appropriate signal (i.e. analog or digital).

As shown in FIG. 8B, terminals 812 and 814 of a typical passive, analog type speaker 810 connect to the voice coil 828 of speaker 810. The voice coil of a typical speaker, such as coil 828, is predominantly an inductive element exhibiting a predictable electrical behavior that can be measured using known techniques. For a digital speaker system 816, digital logic circuits 822 are disposed across the input terminals 818 and 820 of the digital speaker system. Digital circuits 822 receive and process digital signals applied to terminals 818 and 824 and provide a digital output signal that is converted into an analog signal by a digital-to-analog converter 824. The analog signal is then provided to a traditional speaker 826. Thus, the digital speakers 816 will exhibit a predictable electrical behavior that is characteristic of digital circuits 822 and that may be distinguished from the electrical behavior of analog speakers 810.

As shown in FIG. 8C, the voice coil of analog speakers 810 is better modeled with an inductor 828 representing the predominantly inductive behavior of the voice coil, and a series resistor 830 representing the resistance of the coil windings. Thus, sound card 210 may measure the dc impedance of analog speakers 810 to measure coil winding resistance 830. Typically, coil winding resistance 830 will have a lower value, on the order of 2 to 16 ohms, for example. Comparatively, the dc impedance of digital circuits 822 will be higher valued than the dc impedance of analog speakers due to the input impedance of the digital circuits such as the MOSFET inverter 832 shown in FIG. 8C that exhibits a higher input impedance value than the resistance 830 of speakers 810. Typically, the input impedance of digital circuits may range from a low value of 50 ohms to a higher value on the order of megohms. For example, digital circuits 822 may be designed to receive a Sony and Philips Digital Interface Format (SPDIF) digital signal via a coaxial transmission line having a 75 ohm characteristic impedance, in which chase the input impedance of across terminals 818 and 820 would be 75 ohms. The actual input impedance value of digital circuits 822 will depend upon the type of input circuit (e.g., inverter, NOT, NOR, AND, etc.), the design of the circuit (e.g., value of the components, transistor values, etc.), and the type of transistor semiconductor technology utilized (e.g., bipolar, MOSFET, etc.). In general, the input impedance range of analog speakers 810 is lower than the input impedance range of digital speakers 822, especially at or near dc values.

In addition to impedance, other electrical characteristics of analog speakers 810 and digital speakers 816 may be examined to distinguish the type of speakers connected to sound card 210. For example, analog speakers 810 exhibit inductive behavior due to voice coil 828 while digital speakers 822 exhibit little or no inductive behavior since digital circuits are predominantly implemented with semiconductor technologies. Because inductive elements are difficult to realize with semiconductor materials, semiconductor chip circuit designs tend not to implement inductive elements. Therefore, sound card 210 may distinguish analog speakers 810 from digital speakers 816 by measuring and determining their respective inductive characteristics. Furthermore, analog speakers 810 exhibit a frequency response that differs from the frequency response of digital speakers 822. Analog speakers 810 exhibit a resonance characteristic that may be detected (for example, due to the resonance of the speaker cone and suspension of the speaker, or due to self-resonance of voice coil 828), while digital speakers 822 typically will not exhibit any resonance characteristics since digital circuits 822 are generally designed to avoid any resonant behavior. Thus, sound card 210 may examine a connected speaker system for resonant behavior to distinguish the system as being either analog speakers 810 (resonance detected) or digital speakers 816 (no resonance detected). Any known electrical characteristic may be measured, including impedance (resistance, reactance or both), admittance (conductance, substance, or both), inductance, capacitance, gain, attenuation, frequency response, delay time, charge time, voltage, breakdown voltage, reverse voltage, reflection coefficient, etc.

Figure 9:
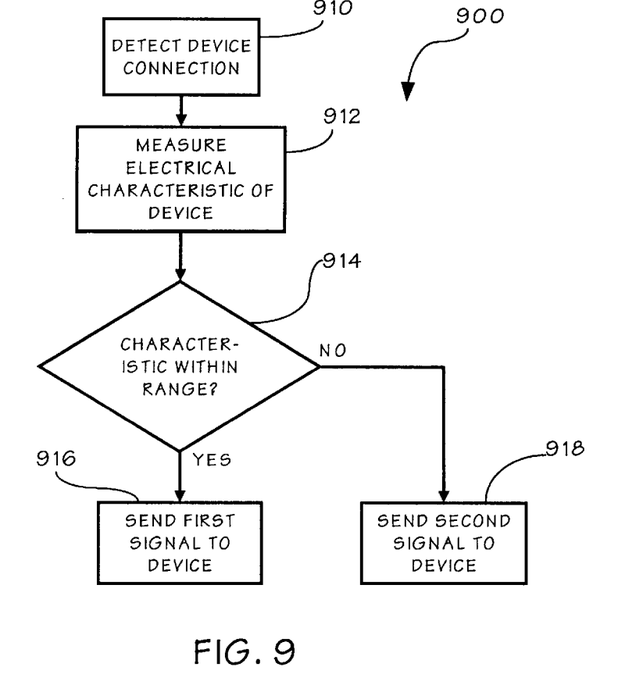
FIG. 9 is a flow diagram of a method for selectively sending a first signal or a second signal to a device in accordance with the present invention.

Referring now to FIG. 9, a flow chart of a method for selectively sending a first signal or a second signal to a device in accordance with the present invention will be discussed. The method 900 initiates with the detection at step 910 of a connection of a device to information handling system 100. An electrical characteristic of the connected device is measured at step 912. A determination is made at step 914 whether the measured characteristic of the device falls within a predetermined range. If the measured characteristic falls within the predetermined range, a first signal is sent to the device at step 916. If the measured characteristic does not fall within the predetermined range, a second signal is sent to the device at step 918.

Figure 10:
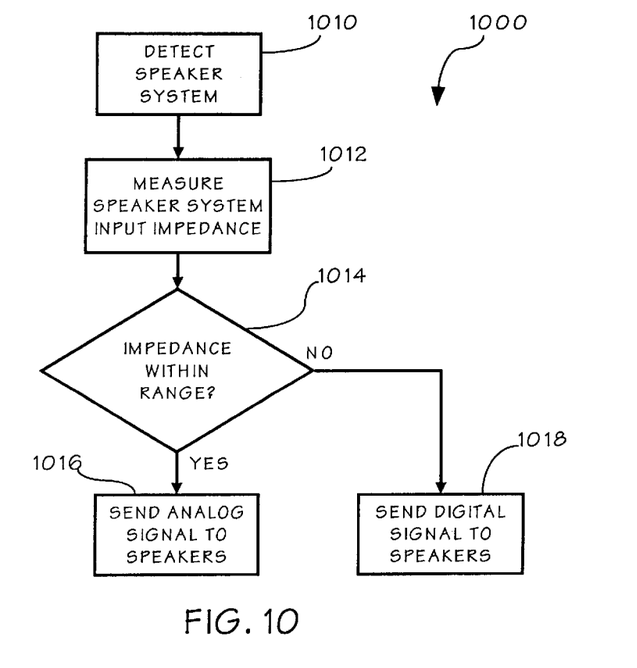
FIG. 10 is a flow diagram of a method for selectively sending an analog or a digital signal to an external device in accordance with the present invention.

Referring now to FIG. 10, a flow diagram of a method for selectively sending an analog or a digital signal to an external device in accordance with the present invention is shown. The method 1000 may be a subset of method 900 discussed with respect to FIG. 9. Method 1000 initiates with the detection at step 1010 of a connection of a speaker system to information handling system 100, for example to sound card 210. The input impedance of the speaker system is measured at step 1012. A determination is made at step 1014 whether the measured input impedance falls within a predetermined range (for example, a lower impedance range). In the event the input impedance falls within the predetermined impedance range (indicative of analog speakers 810), an analog signal is sent to the speakers at step 1016. In the event the input impedance does not fall within the predetermined impedance range (indicative of digital speakers 816), a digital signal is sent to the speakers at step 1018. Methods 900 and 1000 may be implemented as a program of instructions stored in memory 104 and executed by central processing system 102 on information handling system 100.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as auxiliary memory 106 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the analog and digital audio automatic sensing method and apparatus of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for selectively sending a first signal or a second signal provided by a first device to an output of the first device, comprising:

determining an electrical characteristic of a second device coupled to the output of the first device;

in the event the electrical characteristic is determined to be a predetermined value, sending the first signal provided by the first device to the output of the first device; and otherwise, sending the second signal provided by the first device to the output of the first device;

one of the first and second signals being an analog signal, and the other of the first and second signals being a digital signal.

2. A method as claimed in claim 1, wherein said determining step includes the step of measuring the impedance of the device.

3. A method as claimed in claim 1, wherein said determining step includes the step of measuring the admittance of the device.

4. A method as claimed in claim 1, wherein said determining step includes the step of measuring the inductance of the device.

5. A method as claimed in claim 1, wherein said determining step includes the step of measuring the capacitance of the device.

6. A method for selectively sending an analog signal provided by a device to an analog speaker or a digital signal provided by the device to a digital speaker, comprising:

measuring an electrical characteristic at an input of a speaker;

determining whether the speaker is an analog speaker or a digital speaker based upon the measured electrical characteristic;

in the event the speaker is determined to be an analog speaker, sending the analog signal from the device to the input of the speaker; and otherwise, sending the digital signal from the device to the input of the speaker.

7. A method as claimed in claim 6, said measured electrical characteristic being impedance.

8. A method as claimed in claim 7, a lower impedance value indicating the speaker as being an analog speaker.

9. A method as claimed in claim 7, an impedance value less than 50 ohms indicating the speaker as being an analog speaker.

10. A method as claimed in claim 6, said measured electrical characteristic being resonance, the resonance characteristic indicating the speaker as being an analog speaker.

11. A method as claimed in claim 10, the resonance occurring at a frequency below 500 hertz.

12. A method for selectively sending a first signal or a second signal provided by a device to an output receptacle of the device having first and second contacts, comprising:

determining an electrical characteristic between the first and second contacts;

in the event the electrical characteristic is determined to be a predetermined value, sending the first signal provided by the device to the output receptacle; and otherwise, sending the second signal provided by the device to the output receptacle;

one of the first and second signals being an analog signal, and the other of the first and second signals being a digital signal.

13. A method as claimed in claim 12, the receptacle further having a third contact wherein the first, second and third contacts of the output receptacle comprise sleeve, ring and tip contacts, respectively.

14. A method as claimed in claim 12, the output receptacle being a phone jack.

15. A method as claimed in claim 12, wherein said electrical characteristic comprises impedance.

16. A method as claimed in claim 12, wherein said electrical characteristic comprises admittance.

17. A method as claimed in claim 12, wherein the predetermined value is approximately zero valued.

18. A method as claimed in claim 12, wherein the predetermined value is zero valued.

19. A method as claimed in claim 12, wherein the predetermined value is less than a threshold value.

20. A method as claimed in claim 12, wherein the predetermined value is greater than a threshold value.

21. A method for selectively sending either a first or a second information output signal provided by a device of an information handling system to an output of an information handling system, comprising:

monitoring the output for a connector coupled to the output;

determining the type of connector coupled to the output; and providing one of the first or second information signals provided by the device to the output based upon the detected type of connector;

one of the first and second information signals being an analog signal, and the other of the first and second information signals being a digital signal.

22. A method as claimed in claim 21, the output being a phone jack.

23. A method as claimed in claim 21, the connect or being a phone plug.

24. A set of computer instructions capable of being stored on a computer readable medium readable by an information handing system to execute steps for selectively sending a first signal or a second signal provided by a first device to an output of the first device, the steps comprising:

determining an electrical characteristic of a second device coupled to the output of the first device;

in the event the electrical characteristic is determined to be a predetermined value, sending the first signal provided by the first device to the output; and otherwise, sending the second signal provided by the first device to the output;

one of the first and second signals being an analog signal, and the other of the first and second signals being a digital signal.

25. A set of computer instructions as claimed in claim 24, wherein said determining step includes the step of measuring the impedance of the device.

26. A set of computer instructions as claimed in claim 24, wherein said determining step includes the step of measuring the admittance of the device.

27. A set of computer instructions as claimed in claim 24, wherein said determining step includes the step of measuring the inductance of the device.

28. A set of computer instructions as claimed in claim 24, wherein said determining step includes the step of measuring the capacitance of the device.

29. A set of computer instructions capable of being stored on a computer readable medium readable by an information handing system to execute steps for selectively sending an analog signal provided by a device to an analog speaker or a digital signal provided by the device to a digital speaker, the steps comprising:

measuring an electrical characteristic at an input of a speaker;

determining whether the speaker is an analog speaker or a digital speaker based upon the measured electrical characteristic;

in the event the electrical characteristic is determined to be an analog speaker, sending the analog signal provided by the device to the input of the speaker; and otherwise, sending the digital signal provided by the device to the input of the speaker.

30. A set of computer instructions as claimed in claim 29, said measured electrical characteristic being impedance.

31. A set of computer instructions as claimed in claim 30, a lower impedance value indicating the speaker as being an analog speaker.

32. A set of computer instructions as claimed in claim 30, an impedance value less than 50 ohms indicating the speaker as being an analog speaker.

33. A set of computer instructions as claimed in claim 29, said measured electrical characteristic being resonance, the resonance characteristic indicating the speaker as being an analog speaker.

34. A set of computer instructions as claimed in claim 33, the resonance occurrying at a frequency below 500 hertz.

35. A set of computer instructions capable of being stored on a computer readable medium readable by an information handing system to execute steps for selectively sending a first signal or a second signal provided by a device to an output receptacle having first and second contacts, comprising:

determining an electrical characteristic between the first and second contacts;

in the event the electrical characteristic is determined to be a predetermined value, sending the first signal provided by the device to the output receptacle; and otherwise, sending the second signal provided by the device to the output receptacle;

one of the first and second signals being an analog signal, and the other of the first and second signals being a digital signal.

36. A set of computer instructions as claimed in claim 35, the receptacle having a third contact wherein the first, second and third contacts of the output receptacle comprise sleeve, ring and tip contacts, respectively.

37. A set of computer instructions as claimed in claim 35, the output receptacle being a phone jack.

38. A set of computer instructions as claimed in claim 35, wherein said electrical characteristic comprises impedance.

39. A set of computer instructions as claimed in claim 35, wherein said electrical characteristic comprises admittance.

40. A set of computer instructions as claimed in claim 35, wherein the predetermined value is approximately zero valued.

41. A set of computer instructions as claimed in claim 35, wherein the predetermined value is zero valued.

42. A set of computer instructions as claimed in claim 35, wherein the predetermined value is less than a threshold value.

43. A set of computer instructions as claimed in claim 35, wherein the predetermined value is greater than a threshold value.

44. A set of computer instructions capable of being stored on a computer readable medium readable by an information handing system to execute steps for selectively sending either a first or a second information output signal provided by a device of an information handling system to an output of an information handling system, comprising:

monitoring the output for a connector coupled to the output;

determining the type of connector coupled to the output; and providing one of the first or second information signals provided by the device to the output based upon the detected type of connector;

one of the first and second information signals being an analog signal, and the other of the first and second information signals being a digital signal.

45. A set of computer instructions as claimed in claim 44, the output being a phone jack.

46. A set of computer instructions as claimed in claim 44, the connector being a phone plug.

47. An information handing system for automatically determining a characteristic of a signal provided by the information handling system to send to an output of the information handing system, comprising:

a processor for executing instructions on the information handling system;

a memory coupled to said processor for storing the instructions;

a detector coupled to the output of the information handling system for detecting a characteristic of a device coupled to the output, the characteristic being indicative of a characteristic of a signal to send to the output wherein a first signal having a first signal characteristic is sent to the output when the characteristic of the device has a predetermined value and a second signal having a second signal characteristic is sent to the output when the characteristic of the device does not have the predetermined value.

48. An information handling system as claimed in claim 47, said characteristic being impedance.

49. An information handling system as claimed in claim 47, said characteristic being admittance.

50. An information handling system as claimed in claim 49, further comprising:

first and second contacts coupled to the output; and said detector being coupled between said first and said second contacts for detecting a characteristic of a connector coupled to the output, the characteristic being indicative of connector type, wherein the first type of signal is sent to the output in response to a first type of connector being coupled to the output and the second type of signal is sent to the output in response to a second type of connector being coupled to the output.

51. An information handing system for automatically determining a characteristic of a signal provided by the information handling system to send to an output of the information handing system, comprising:

means for executing instructions on the information handling system;

means, coupled to said executing means, for storing the instructions;

means coupled to the output of the information handling system for detecting a characteristic of a device coupled to the output, the characteristic being indicative of a characteristic of a signal to send to the output wherein a first signal having a first signal characteristic is sent to the output when the characteristic of the device has a predetermined value and a second signal having a second signal characteristic is sent to the output when the characteristic of the device does not have the predetermined value.

52. An information handling system as claimed in claim 51, said characteristic being impedance.

53. An information handling system as claimed in claim 51, said characteristic being admittance.

54. An information handling system as claimed in claim 51, further comprising:

first and second means for coupling signals to the output; and said detecting means being coupled between said first and said second coupling means for detecting a characteristic of a connector coupled to the output, the characteristic being indicative of connector type, wherein the first type of signal is sent to the output in response to a first type of connector being coupled to the output and the second type of signal is sent to the output in response to a second type of connector being coupled to the output.

55. An apparatus, comprising:

means for detecting an electrical characteristic of a second device coupled to an output of a first device;

means for sending a first signal to the output of the first device in the event said detecting means detects the electrical characteristic of the second device to be a first characteristic; and means for sending a second signal to the output of the first device in the event said detecting means detects the electrical characteristic of the second device to be a second characteristic;

one of the first and second signals being an analog signal, and the other of the first and second signals being a digital signal.

56. An apparatus as claimed in claim 55, wherein the first signal sent by said first signal sending means is an analog signal when said detecting means detects an analog characteristic of the second device.

57. An apparatus as claimed in claim 55, wherein the second signal sent by said second signal sending means is a digital signal when said detecting means detects a digital characteristic of the second device.

58. An apparatus as claimed in claim 55, wherein the first signal sent by said first signal sending means is an analog signal when said detecting means detects an analog characteristic of the second device, the second device being an analog speaker for receiving an analog input.

59. An apparatus as claimed in claim 55, wherein the second signal sent by said second signal sending means is a digital signal when said detecting means detects a digital characteristic of the second device, the second device being a digital speaker for receiving a digital input.

60. An apparatus as claimed in claim 55, said detecting means including at least one or more of the following structures: a phone jack, a phone plug, an impedance detector, a resistance detector, a conductance detector, an admittance detector, a substance detector, an inductance detector, a resonance detector, a capacitance detector, a gain detector, an attenuation detector, a frequency response detector, a delay time detector, a charge time detector, a voltage detector, a breakdown voltage detector, a reverse voltage detector, a reflection coefficient detector, a semiconductor detector, a logic circuit detector, and a current detector.

61. An apparatus as claimed in claim 55, at least one of said detecting means, said first signal sending means, and said second signal sending means being implemented with a sound card structure.

62. An apparatus as claimed in claim 55, at least one of said detecting means, said first signal sending means and said second signal sending means including a digital signal processor.

* * * * *